United States Patent [19]

Athanassiu

[11] Patent Number: 4,969,629
[45] Date of Patent: Nov. 13, 1990

[54] DIAPHRAGM VALVE

[75] Inventor: Christos Athanassiu, Winchester, Mass.

[73] Assignee: The BOC Group, Inc., New Providence, N.J.

[21] Appl. No.: 442,022

[22] Filed: Nov. 28, 1989

[51] Int. Cl.$^5$ .......................... F16K 7/12; F16K 31/06
[52] U.S. Cl. ................. 251/331; 251/129.17; 251/129.21
[58] Field of Search .................... 251/331, 334, 129.17, 251/129.21

[56] References Cited

U.S. PATENT DOCUMENTS

| | | | |
|---|---|---|---|
| 1,410,205 | 3/1922 | Madigan | 251/331 |
| 2,596,409 | 5/1952 | Johnson et al. | 251/129.17 X |
| 4,867,201 | 9/1989 | Carten | 251/331 X |

Primary Examiner—Arnold Rosenthal
Attorney, Agent, or Firm—David M. Rosenblum; Robert I. Pearlman

[57] ABSTRACT

The present invention provides a diaphragm valve including a housing having a chamber and an outlet opening within the chamber. A projecting valve seat, formed by a projection extending into the chamber, has a sloping, annular sealing surface surrounding the outlet opening. A valve body, preferably forming an armature of an electromagnetic coil, is also located within the chamber. The valve body has, at one end, a recess and a metal diaphragm covering the recess and chemically non-reactive with a flowing fluid passing through the chamber and out of the outlet opening. The valve body is adapted for movement towards and away from the valve seat between closed and open positions. In the closed position the diaphragm is flexed into the recess by the projection, conformingly and sealingly contacting the sealing surface and covering the outlet opening, to prevent the passage of flowing fluid. In the open position, the diaphragm is spaced from the valve seat and the outlet opening is uncovered to allow passage of the flowing fluid. The diaphragm is prestretched before attachment to the valve body so that the diaphragm conforms to the sloping sealing surface of the valve seat rather than creasing above the valve seat.

4 Claims, 6 Drawing Sheets

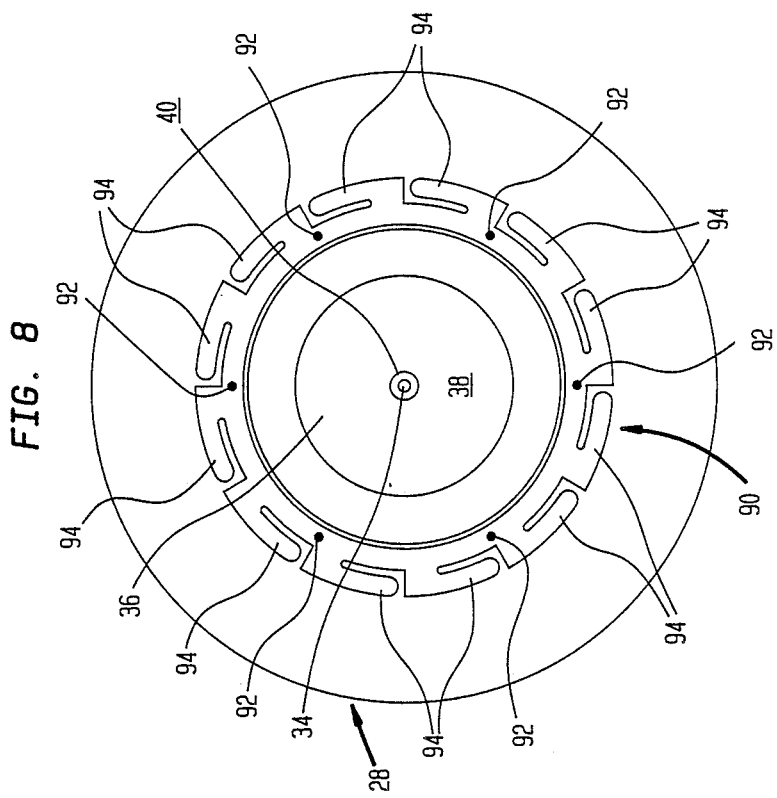

DIAPHRAGM VALVE

BACKGROUND OF THE INVENTION

The prior art has provided diaphragm valves to selectively allow and prevent passage of a flowing fluid. In one type of diaphragm valve a housing is provided with a chamber having an outlet opening, an inlet passageway communicating between the chamber and the outside of the housing for receiving the flowing fluid within the chamber and an outlet passageway communicating between the outlet opening and the outside of the housing for discharging the flowing fluid from the chamber and out of the housing. The housing is also provided with a projection extending into the chamber and having an annular sealing surface surrounding and sloping away from the outlet opening to form a valve seat. Additionally, a valve body is located within the chamber that has a recess and elastomeric diaphragm covering the recess. The valve body is adapted for movement towards and away from the valve seat between a closed position and an open position. In the closed position, the diaphragm is flexed into the recess by the projection, conformingly and sealably contacting the sealing surface and covering the outlet opening, to prevent the passage of the flowing fluid through the housing. In the open position, the diaphragm is spaced from the valve seat and the outlet opening is uncovered to allow the passage of the flowing fluid through the housing.

The problem with a diaphragm valve incorporating an elastomeric diaphragm is that the elastomeric material forming the diaphragm may chemically react with certain fluids. Such a chemical reaction may introduce impurities, i.e. chemical products from the reaction and fine particles of elastomer, into the flow of the fluid. As a result, diaphragm valves incorporating elastomeric diaphragms are not suitable in applications where the purity of the fluid is to be maintained.

In another type of prior art diaphragm valve design, the diaphragm is fabricated from a metal that is not chemically reactive with the flowing fluid so that the diaphragm valve may be used in high purity applications. An example of such a valve design may be found in U.S. Pat. No. 4,828,219. In the valve design of this patent, a chamber defined in a housing is subdivided by a metal diaphragm into a pair of valve and drive chambers. The fluid flows into the valve chamber through an inlet passageway and out of the valve chamber through an outlet opening of an outlet passageway. A valve seat, provided within the valve chamber surrounds the outlet opening. A valve stem, located within the drive chamber, is forceably driven against the diaphragm to in turn drive the diaphragm against the valve seat in order to seal the outlet opening and thereby to prevent passage of the flowing fluid through the valve housing.

In order to effectuate a seal in a metal diaphragm valve, such as that disclosed in U.S. Pat. No. 4,828,219, relatively high valve closing forces are required. For instance, in one embodiment of the '219 patent, a handle is provided to urge the stem against the diaphragm. The high closure force of the '219 patent makes the valve design, disclosed therein, particularly unsuitable for applications requiring rapid valve actuation and/or light valve closure forces. In the prior art, rapid valve actuation is produced by electromagnetic actuation and such electromagnetic actuation does not produce enough force to close the valve of the '219 patent. In a diaphragm valve design having an elastomeric diaphragm, such as discussed above, relatively low valve closure forces are required because only light forces are required to deform the elastomer into its deformed state sealing the outlet opening. In order to produce a metal diaphragm valve having a rapid actuation time and a light valve closing force, it is not possible to simply replace the elastomeric diaphragm in the elastomeric diaphragm valve with a metal diaphragm. If this were done, when the metal diaphragm contacted the valve seat, it would flex or crease over the valve seat and therefore, no seal would be produced between the valve seat and the diaphragm. If one attempted to increase the valve closure force to prevent creasing, a permanent deformation would be produced in the diaphragm to prevent valve resealing.

SUMMARY OF THE INVENTION

The present invention provides a diaphragm valve comprising a housing, a valve body and actuation means for moving the valve body between an open and a closed position. The housing includes a chamber having an outlet opening, a pair of inlet and outlet means, and a projection extending into the chamber. The pair of inlet and outlet means respectively pass a flowing fluid into the housing and the chamber and out of the outlet opening and the housing. The projection has an annular sealing surface surrounding and sloping away from the outlet opening. The valve body, located within the chamber, has a recess and a flexable diaphragm covering the recess. The valve body is adapted for movement towards and away from the valve seat, between the closed and open positions. In the closed position, the diaphragm is flexed into the recess by the projection, conformingly and sealably contacting the sealing surface and covering the outlet opening, for preventing passage of the flowing fluid through the housing. In the open position, the diaphragm is spaced from the valve seat and the outlet opening is uncovered for allowing passage of the flowing fluid through the housing.

In accordance with the present invention, the diaphragm is formed from a flexible metal sheet chemically non-reactive with the flowing fluid to maintain fluid purity. Additionally, the flexible metal sheet is pre-stretched across the recess to allow the sheet to be deformed by the valve seat and to conformingly contact the sealing surface, rather than to crease above the valve seat. As a result, the present invention provides a diaphragm valve having the advantages of prior art elastomeric diaphragm valves and metal diaphragm valves.

BRIEF DESCRIPTION OF THE DRAWINGS

While the specification concludes with claims particularly pointing out the subject matter that Applicant regards as his invention, it is believed the invention will be better understood from the following description taken in conjunction with the accompanying drawings in which:

FIG. 8 is a front view of an orifice and an attached fingerplate utilized in the mass flow controller illustrated in FIGS. 1 and 2.

DETAILED DESCRIPTION OF THE PREFERRED EMBODIMENT

Figure 1:
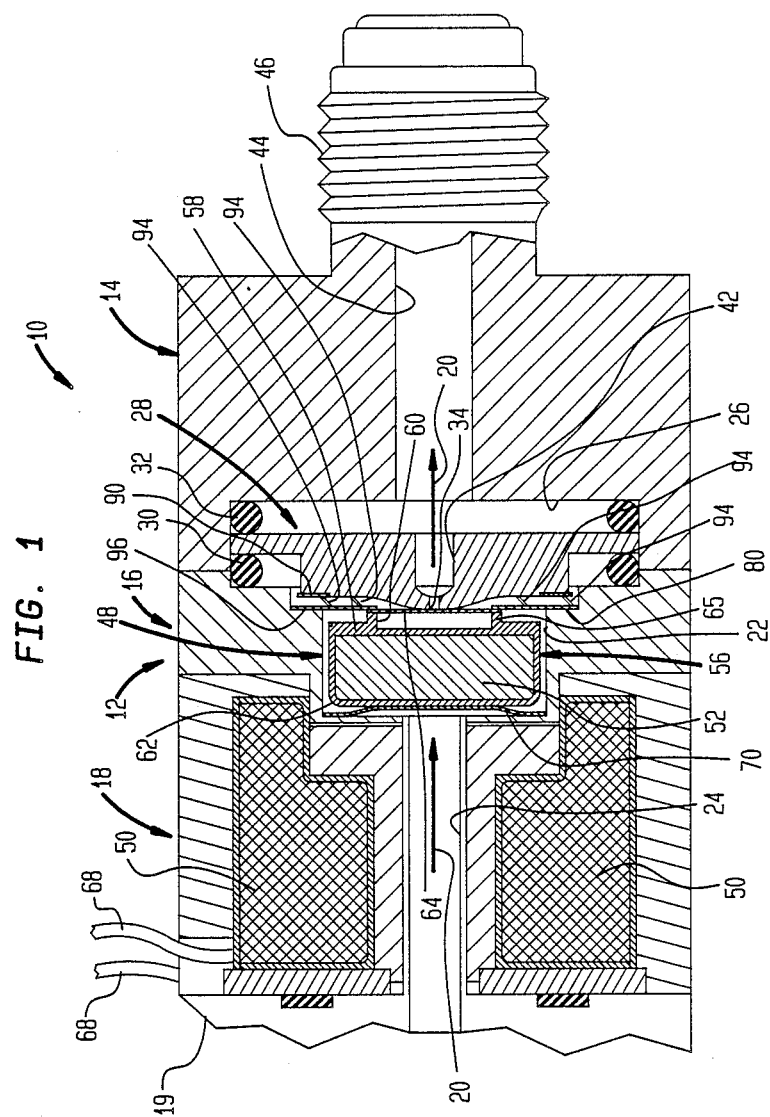
FIG. 1 is a fragmentary sectional view of a diaphragm valve in accordance with the present invention incorporated into the design of a mass flow controller.
Figure 2:
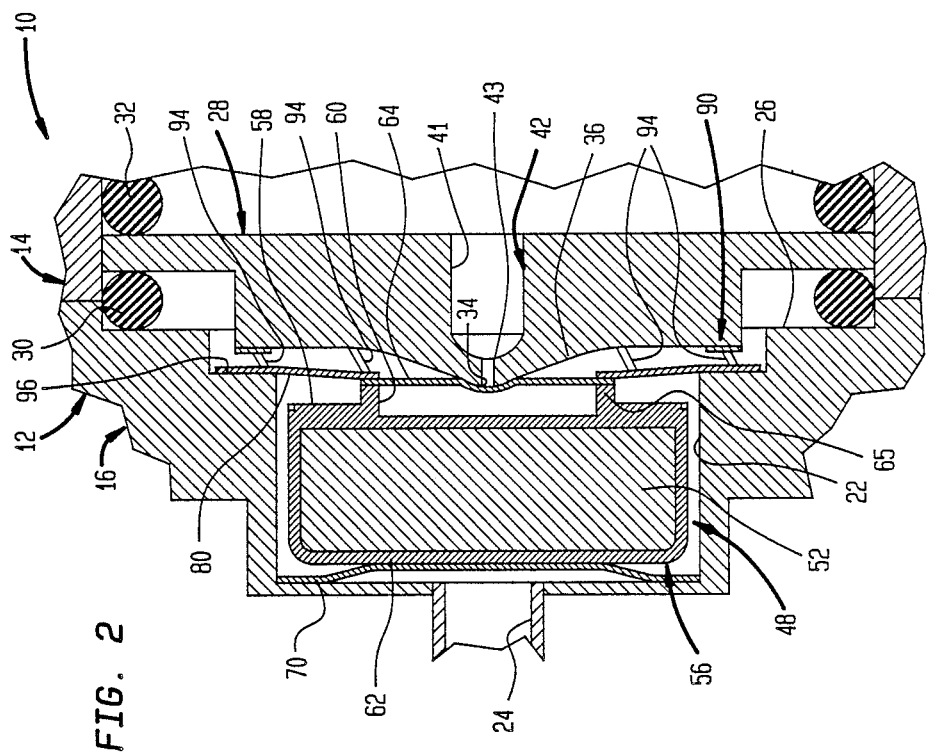
FIG. 2 is an enlarged fragmentary sectional view of the diaphragm valve shown in FIG. 1.

Referring to FIGS. 1 and 2 a preferred diaphragm valve in accordance with the present invention is illustrated for use in a mass flow controller well known in the art, specifically DATAMETRICS Type 825, 831, and 832 Mass Flow Controllers manufactured by the Edwards High Vacuum International division of The BOC Group, Inc., the Assignee herein. However, as will be discussed, the preferred diaphragm valve, with suitable modification, could be used in any application and could function in an environment independent of a mass flow controller.

Diaphragm valve 10 is of the inline flow type and has a housing 12 formed by a set of three in-line sections 14, 16 and 18. Section 18 is illustrated as connected to a fragment of a section 19. In section 19, a sidestream of gas is sampled to generate a signal referable to the mass flow rate of the flowing gas designated by arrowhead 20.

Housing 12 is provided with a valve chamber 22 and an inlet passageway 24 for receiving gas 20 within valve chamber 22. An orifice chamber 26 is provided in line and in communication with valve chamber 22 for containing an orifice 28. Orifice 28 closes off valve chamber 22 and is held in position by a pair of O-ring 30 and 32.

With reference also to FIG. 8, orifice 28 is provided with a central outlet opening 34 and a valve seat 36 formed by a projecting portion of orifice 28. Valve seat 36 is essentially of frustroconnical configuration and provides a sloping and annular sealing surface 38 surrounding outlet opening 34. A spherical transitional area 40 is provided between the major portion of sloping sealing surface 38 and the edges of orifice 28 defining outlet opening 34.

Gas 20 is discharged from valve chamber 22 through outlet opening 34 of valve seat 36 by provision of a first outlet passageway 42 of orifice 28 having large and narrow portions 41 and 43. Gas 20 then flows from orifice chamber 26 out of housing 12 via a second outlet passageway 44. A threaded coupling 46 is integrally formed at the end of housing 12 to connect a discharge line, not illustrated, for discharge of gas 20. In this regard, Section 18, instead of being connected to Section 19, could be formed with a coupling identical to coupling 46 for inlet of a gas from an inlet line so that valve 10 could function in an environment independent of a mass flow controller.

An actuatable valve of the electromagnetic type is provided. The valve includes a valve body 48 which acts as an armature for a coil 50. Valve body 48 is formed by a soft iron core 52 clad in a layer 56 of 316 stainless steel. Cladding layer 56 defines a front end 58 of valve body 48 having a recess 60 and a rear end 62. Front end 58 of valve body 48 is provided with a ring-like rib 65 integrally formed with cladding layer 56.

A diaphragm 64 is connected to ring-like rib 65. Diaphragm 64 is formed from a sheet of 316 stainless steel of approximately between about 0.0254 and 0.01524 millimeters in thickness. Such material is not chemically reactive with even the most corrosive of gases. Diaphragm 64 is formed by stretching a square sheet of the aforementioned material over rib 65 and thus, recess 60. After such stretching, the sheet is stitch-welded to rib 65 and any excess material is removed with an X-ACTO knife to form a prestretched metal diaphragm of circular configuration. It should be noted that in attaching diaphragm 64 to valve body 48, contaminants may be trapped within recess 60. Moreover, in a common application of a mass flow controller a series of gases are metered at various times during a chemical reaction. As a result, during the metering of a gas in such chemical reaction, a prior metered gas could become trapped in recess 60 to contaminate the gas to be metered. In order to prevent such contamination trapping, diaphragm 64 hermetically seals recess 60.

Valve 48 is adapted for movement towards and away from valve seat 38 between closed and open positions. In the closed position, illustrated in the Figs., the outlet opening 34 is sealed to prevent the flow of gas 20 through housing 12. In the open position outlet opening 34 is uncovered to allow gas 20 to flow out of housing 12. Such movement of valve body 48 is controlled by coil 50, which moves valve body 48 into its open position by magnetic attraction when current applied to lead wires 68 of coil 50.

When valve body 48 is in the closed position, diaphragm 64 is flexed into recess 60 by valve seat 36 to conformingly and sealably contact sealing surface 38 of valve seat 36 and cover outlet opening 34, thereby to seal outlet opening 34. Since diaphragm 64 is prestretched prior to its attachment to valve body 48 it conforms to sealing surface 38. If diaphragm 64 were simply attached to valve body 48, without prestretching, it would tend to crease upon contact with valve seat 36 and its sealing surface 38. Depending upon the actual thickness of material selected, such creasing could result in rupture or a permanent deformation of the diaphragm. In any event, the potential creasing of a metal diaphragm would not allow a seal to be effectuated. When valve body 48 is retracted into its open position, diaphragm 64 reverts to an essentially flat condition, spaced from outlet opening 34, to permit passage of gas 20 through housing 12.

In order to obtain the best seal possible between diaphragm 64 and valve seat 36, diaphragm 64 should have no wrinkles. Moreover, both diaphragm 64 and sealing surface 38 should be polished in a lathe so that any scratches produced are concentric. The polishing compound should be non-embedding and of fine grit to produce as smooth a finish as possible. Final polishing can take place by rotating valve body 48 and orifice 28 in opposite directions with diaphragm 64 in contact with sealing surface 38.

Figure 7:
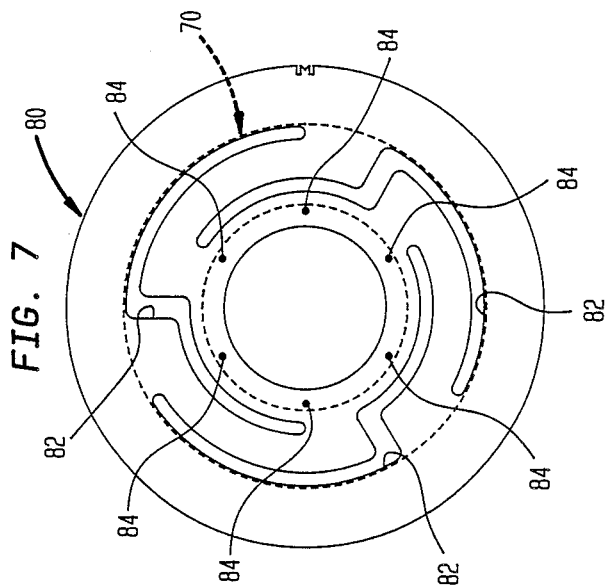
FIG. 7 is a front view of FIG. 5.
Figure 6:
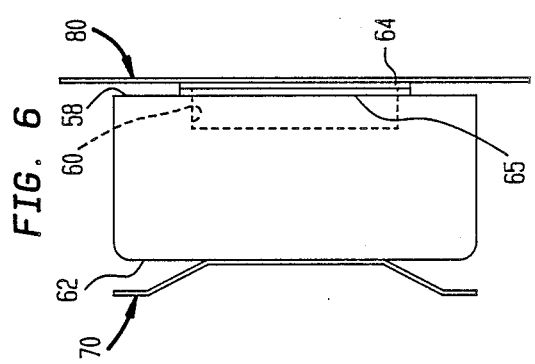
FIG. 6 is an elevational view of FIG. 5.
Figure 5:
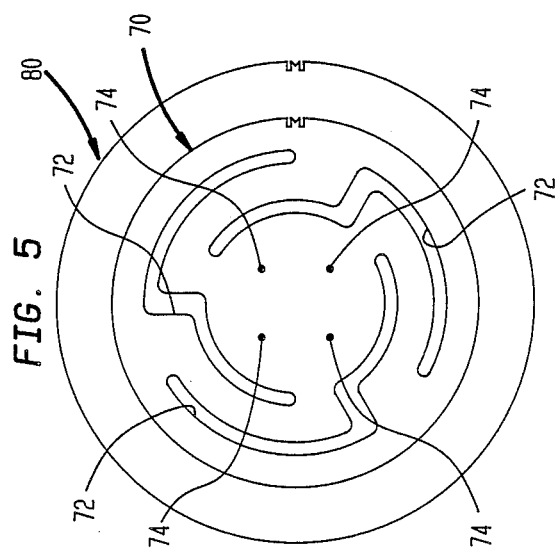
FIG. 5 is a rear view of a valve body in accordance with the present invention incorporated into the diaphragm valve illustrated in FIG. 1.

Gas 20 flows through an apertured rear spring plate 70 around valve body 48 and through an apertured front spring plate 80 to outlet opening 34. With additional reference now to FIGS. 5–7, rear spring plate 70 is formed by a disc of resilient metal that is peripherally and rearwardly bent. Rear spring plate 70 peripherally contacts the inner surface of housing 12 forming valve chamber 22 to center valve body 48 within valve chamber 22. Rear spring plate 70 is provided with a set of three spiral apertures 72 for passage of gas 20 and is connected to rear end 62 of valve body 52 by provision of spot welds 74. The illustrated diaphragm valve 10 is of the normally closed type. Until the time that coil 50 is energized, valve body 48 is held in its closed position by front spring plate 80. Front spring plate 80 is similar in design to rear spring plate 70 and is provided with a set of three spiral apertures 82 for passage of gas 20 and is attached to rib 65, over diaphragm 64, by provision of a set of 6 spot welds 84.

With reference again to FIG. 8, front spring plate 80 and thus valve body 48 is held in place by an annular finger plate 90 spot welded to orifice 28 by spot welds 92. Finger plate 90 is provided with a plurality of fingers 94 that are bent at an angle of about 60 degrees from the plane of finger plate 90 to peripherally contact front spring plate 80 and to hold spring plate 80 in place against a shoulder 96 of valve chamber 22.

Figure 3:
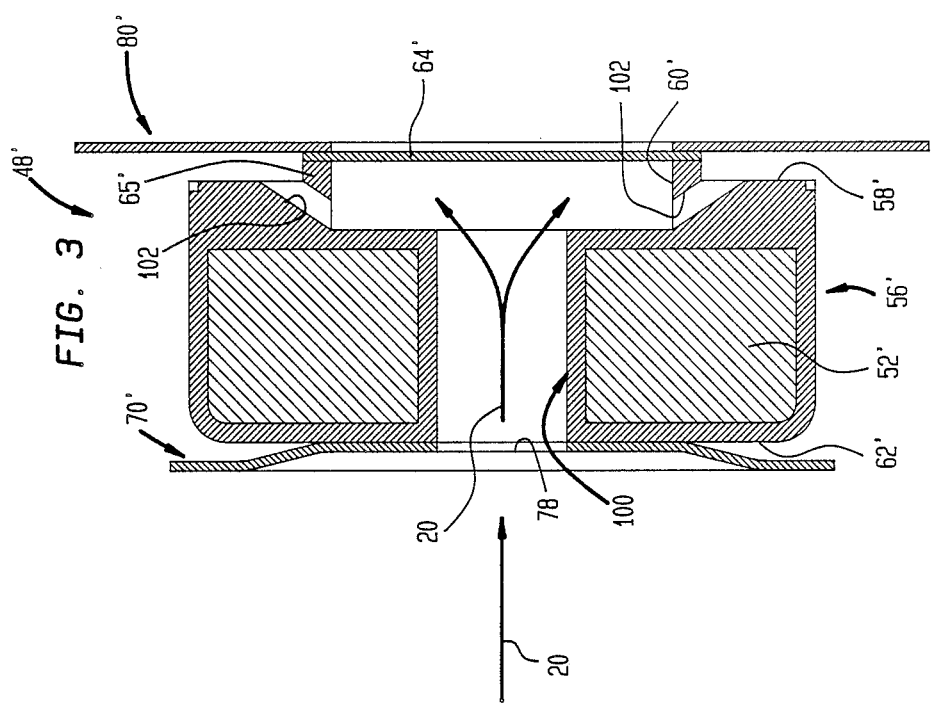
FIG. 3 is a sectional view of an alternative embodiment of a valve body in accordance with the present invention.

With reference to FIG. 3, a valve body 48' is illustrated that forms an alternative embodiment of a valve body in accordance with the present invention to be used in place of valve 48. Valve body 48' has a soft iron core 52' covered by a cladding layer 56' forming a front end 58' and a rear end 62' and an annular rib 65' defining a recess 60'. A diaphragm 64' is stretched across recess 60' and is identical to diaphragm 64. A front spring plate 80' is used to urge valve body 48' into a normally closed position. A rear spring plate 70' centers valve body 48 within valve cavity 22.

Valve 48' and all of its associated elements, rear spring plate 70' and front spring plate 80' are all essentially identical to the same elements discussed in relation to valve body 48. There are, however, important differences between valve body 48' and valve body 48. Valve body 48' is provided with an axial bore 100 communicating between recess 60' and rear end 62'. Additionally, rear spring plate 70' is provided with an opening 78 concentrically located with respect to the axis of axial bore 100. Valve body 48' is also provided with one or more radial bores 102 communicating between front end 58' and recess 60. In such embodiment, flowing fluid 20 flows through concentric opening 78 in rear spring plate 70', through axial bore 100, into recess 60' and out of radial bores 102 such that flowing gas 20 continually flushes recess 60'. Such continual flushing is an alternative manner of insuring that contaminants do not become trapped within the recess of a valve body in accordance with the present invention. In this regard, although not illustrated, a possible additional embodiment would be to simply provide a series of radial bores, such as 102, without an axial bore, such as 100, to allow contaminants to escape from the recess of a valve body.

Figure 4:
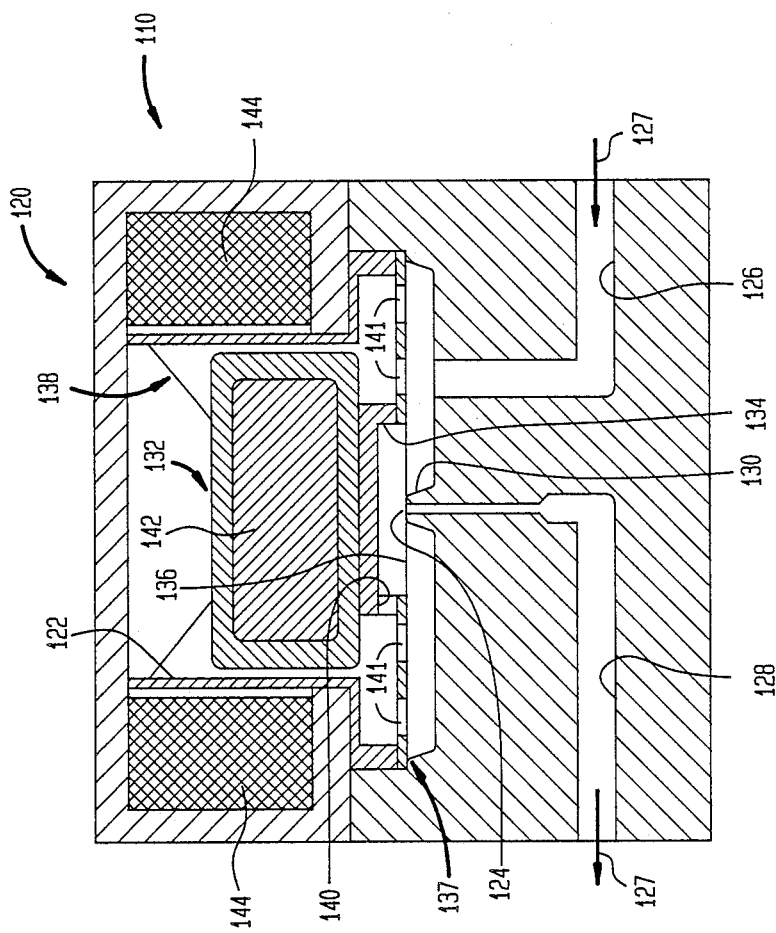
FIG. 4 is a sectional view of an alternative embodiment of a diaphragm valve in accordance with the present invention.

With reference to FIG. 4, another embodiment of a valve in accordance with the present invention is illustrated. Valve 110 is an upright valve provided with a housing 120 including a valve chamber 122 having an outlet opening 124. An inlet passageway 126 communicates between valve chamber 122 and the outside of housing 120. Outlet passageway 128 communicates between opening 124 and the outside of the housing for discharging flowing fluid 127 from housing 120.

A valve seat 130 of frustroconnical configuration is provided by a projection extending into valve chamber 122. The frustroconnical configuration of valve seat 130 provides a sealing surface surrounding outlet opening 124. A valve body 132 is provided with a recess 134. A metallic diaphragm 136 is stretched across recess 134 to conformingly contact the sealing surface provided by valve seat 130 and to cover outlet opening 124, thereby to prevent flowing fluid 127 from passing through outlet opening 124. Valve body 132 is biased to normally be in a closed position with diaphragm 136 covering outlet opening 124 and conformingly contacting the sloping sealing surface provided by valve seat 130. This is accomplished by a front spring plate 137. A rear spring plate 138 is provided to center valve body 136 within valve chamber 122. In order to prevent contamination trapping, the front of valve body 132 is provided with a single radial passageway 140. Front spring plate 136 is provided with a plurality of apertures 141 to allow flowing fluid 127 to pass through radial passageway 140 and flush recess 134 in order to prevent contamination trapping within recess 134. Valve body 132 has a core of ferromagnetic material 142 and is electromagnetically attracted by a field coil 144 to move valve body 132 into an open position.

Although the present invention has been illustrated in the preceding Figs. for use in mass flow controllers and upright valves of the normally closed type and employing electromagnetic actuation, the invention is not limited by such illustrations. A valve in accordance with the present invention could be of the normally open type or a valve that is not biased in either of the open or closed positions. Moreover, other well-known non-electromagnetic valve actuation could be employed. Lastly, a diaphragm valve could be constructed in accordance with the teachings of the present invention to be used in selectively preventing and allowing passage of a liquid instead of a gas.

While preferred embodiments of the invention has been shown and described in detail, it will be readily understood and appreciated by those skilled in the art that numerous omissions, changes and additions may be made without departing from the spirit and scope of the present invention.

I claim:
1. In a diaphragm valve of the type comprising: a housing including, a chamber having an outlet opening, a pair of inlet and outlet means for respectively passing a flowing fluid into said housing and said chamber and out of said outlet opening and said housing, and a projection extending into said chamber and having an annular sealing surface surrounding and sloping away from said outlet opening to form a valve seat; a valve body located within said chamber and having, at one end, a recess and a flexable diaphragm covering said recess, said valve body adapted for movement towards and away from said valve seat between a closed position with said diaphragm flexed into said recess by said projection, conformingly and sealably contacting said sealing surface and covering said outlet opening, for preventing passage of the flowing fluid through said housing and an open position with said diaphragm spaced from said valve seat and said outlet opening uncovered for allowing passage of the flowing fluid through said housing., and actuation means for moving said valve body between its said closed and open positions, the improvement comprising:
said diaphragm formed from a flexible metal sheet, chemically non-reactive with the flowing fluid to maintain fluid purity and prestretched across said recess to allow deformation of said metal sheet by said valve body and conforming and sealing contact of said metal sheet with said sealing surface without creasing.

2. The improvement of claim 1 wherein said recess is hermetically sealed by said diaphragm to prevent contaminants from being trapped in said recess.

3. The improvement of claim 1 wherein said valve body has at least one radial passageway communicating between said recess and its outer surface to prevent the trapping of contaminants within said recess.

4. The improvement of claim 3 wherein:
said diaphragm valve is of the inline flow type; and
said valve body further has an axial bore communicating between the other of its ends and said recess for allowing the flowing fluid to flush said recess and thereby prevent contaminants from being trapped within said recess.

* * * * *